United States Patent [19]

Rumball

[11] 4,020,140
[45] Apr. 26, 1977

[54] METHOD OF MAKING A FRUSTO-CONICAL CONTAINER HAVING REDUCED DISTORTION TENDENCIES FROM A BLANK SEAMED BY INJECTION MOLDING

[75] Inventor: Kenneth Francis Rumball, Great Bookham, England

[73] Assignee: Airfix Industries Limited, London, England

[22] Filed: June 2, 1975

[21] Appl. No.: 582,898

[52] U.S. Cl. .................. 264/261; 220/75; 229/4.5; 229/48 T; 264/266; 264/328; 428/35; 428/211

[51] Int. Cl.² .................. B29D 23/02; B29F 1/10

[58] Field of Search .......... 264/263, 274, 261, 259, 264/266, 328; 220/75, 80, 81 R; 229/4.5, 48 R, 48 T; 428/35, 211

[56] References Cited

UNITED STATES PATENTS

| 175,138 | 3/1876 | Murphy | 229/48 R |
|---|---|---|---|
| 453,946 | 6/1891 | Shipe | 220/80 X |
| 788,821 | 5/1905 | Conover | 220/80 |
| 1,736,539 | 11/1929 | Lachman | 220/75 X |
| 1,747,964 | 2/1930 | Wirth | 264/274 X |
| 1,856,415 | 5/1932 | Halpbrin et al. | 264/46.9 |
| 2,392,734 | 1/1946 | Haberstump | 264/261 X |
| 3,135,455 | 6/1964 | Santangelo | 229/48 R X |
| 3,359,002 | 12/1967 | Wolf | 264/274 X |
| 3,476,852 | 11/1969 | Shattuck | 264/261 |
| 3,511,902 | 5/1970 | Santangelo | 264/259 X |
| 3,868,893 | 3/1975 | Sutch | 93/50 |
| 3,893,777 | 7/1975 | Jones | 264/263 X |

FOREIGN PATENTS OR APPLICATIONS

| 1,348,370 | 3/1974 | United Kingdom | 264/263 |

Primary Examiner—Philip Anderson
Attorney, Agent, or Firm—Scrivener Parker Scrivener and Clarke

[57] ABSTRACT

In making a frusto-conical container from a blank which is seamed at juxtaposed edges by injection molding, the resiliency of the material arising from compression at the concave face on bending the blank is reduced by deforming the material in that face by means of the tools between which the blank is clamped for the injection molding. Thereby the strain on the seam and tendency to go out of shape due to the resilience are reduced.

3 Claims, 2 Drawing Figures

METHOD OF MAKING A FRUSTO-CONICAL CONTAINER HAVING REDUCED DISTORTION TENDENCIES FROM A BLANK SEAMED BY INJECTION MOLDING

This invention is concerned with improvements in and relating to containers and more particularly composite containers in which at least one flexible blank is held to the desired shape of the container by one or more axially extending seams formed by injection moulding.

United Kingdom Patent 1,348,370 there is described a composite container wherein a single blank forms the peripheral wall and an injection moulding forms a seam between two juxtaposed edges of the blank to complete the peripheral wall, a seam between the blank and end closure means and a lip around the open end of the container, the moulding constraining the wall to the desired shape.

In U.S. Pat. No. 3,868,893 there is described and claimed apparatus for making a container from a blank which includes an end panel from which extend side panels. These side panels are folded relative to the end panel and juxtaposed sides of adjacent side panels and the side panel edges adjacent the end panel are seamed by injection moulding.

It has been found that if a blank forming the whole or part of the peripheral wall is constrained to a curved configuration by the seam or seams, then the more resilient is the card or board, the greater the strain on the seams in constraining the blank with the possibility of rupture of the bond between the injection moulded seams and the blank and/or the tendency of the blank to distort from the desired circular cross-sectional shape of the container.

According to this invention there is provided a method of making a container in which blank material of paper, card or board is received between a core tool and a cavity tool of an injection moulding machine which define a blank cavity for receiving the blank material and constraining the blank material to the final shape of the blank material in the finished container and a mould cavity for receiving injected material which will seam juxtapoxed edges of the blank material and injecting material into the mould cavity while the blank material is constrained to final shape by the mould tools, the tools further serving to constrain at least a part of the blank material to a curved shape and in the region of that curve deforming the blank material to reduce the inherent resilience of the blank material tending to return it to its original condition before constraint to a curved shape.

In order that the present invention may be well understood, there will now be described an embodiment thereof, given by way of example only, reference being had to the accompanying drawing in which.

The blank is of any suitable material such as card and is preferably as shown and described in U.S. Pat. no. 3,931,385. Such a blank includes a base or end panel 1 and two side panels 2. The junction between each side panel and the base panel is cut at 26 as described with reference to FIG. 3 of the complete specification of U.S. Pat. No. 3,391,385. The purpose is to provide two hinge parts, at each of which the blank may be folded around the end periphery of the core tool. The cut results in a part of the base panel being cut away when the blank is folded from which follows the advantage of being able to urge the blank against the cavity tool by means of injected material which is thereby prevented from reaching the external surface of the blank.

When the blank is to be made up, a machine as shown in U.S. Pat. No. 3,868,893 referred to above is preferably employed. As shown and described in said patent with reference to FIG. 3, the blank is guided to a position in which the base panel is in front of the leading end of a core tool shown at 10 in that Figure. As this is advanced toward a split cavity tool 14, 15 the blank folds and the split cavity tools come together without relative axial movement between the core tool and cavity tools in the closing stages.

When the tools are closed however, they press tightly against the inner and outer surfaces of the blank so that at the region of each pair of edges to be seamed the blank seals the space between the core tool and each cavity tool.

Figure 1:
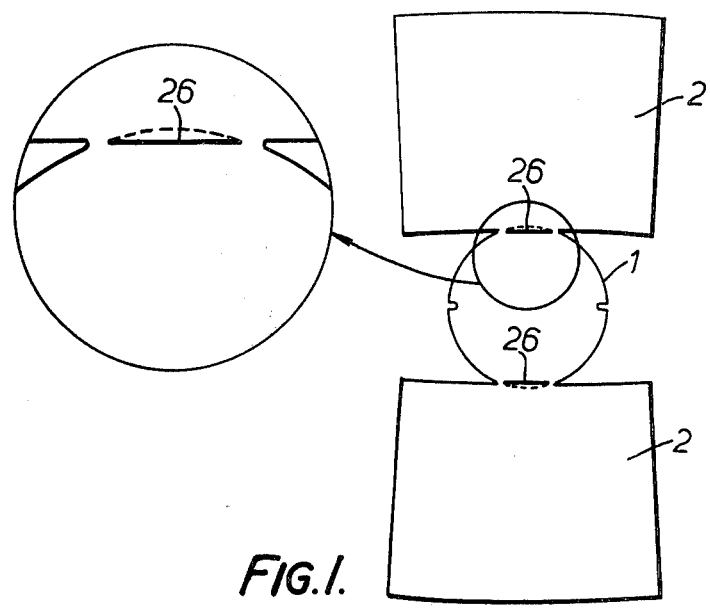
FIG. 1 is a plan view of a blank.
Figure 2:
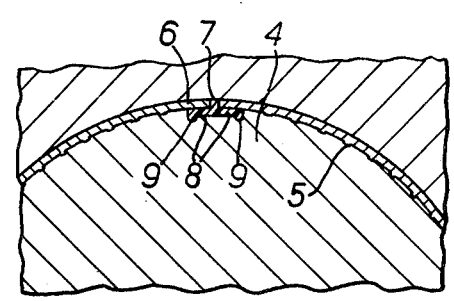
FIG. 2 is an enlarged cross section of part of two side panels of the blank between two mould tools, and a seam joining them.

To reduce the natural resilience of the blank, one of the tools is provided with means which alter the material. In the case illustrated in FIG. 2 hereof, the core tool indicated at 4 is provided with very narrow and shallow channels 5. The excess material of the blank resulting on the concave face of the blank due to blending and which tends to be compressed by the bending is pressed into the channels thereby reducing the force engendered by such compression which would otherwise tend to return the blank to the flat condition. Thus the strain on the axial seams in the complete article is reduced. One such seam is shown at 6 which includes an arm 7 lying between the panel edges, and two arms 8 overlying the seamed panels. Each arm 8 is shown having an enlarged cross section 9 at points spaced outwards from the seam arm 7. This, as explained in co-pending Application No. 581,670 filed May 28, 1975 and assigned to the same assignee as the present invention provides preferred paths for injected material flowing along the seam region. Having preferred flow paths the injected material follows them, presses the blank hard against the cavity tool in the region of each preferred flow path and then flows circumferentially out of the preferred flow paths to the region of the arm 7 where it will not penetrate to the outside surface of the blank because that surface is already pressed hard against the surface of the cavity tool.

The above-described method and apparatus provide an efficient and inexpensive solution to what may otherwise be a problem giving rise to an unacceptable rate of reject. The treatment of the blank material is effected without any additional step in the manufacturing process and the smooth external surface of the blank, which is normally printed before being made up into a container, remains unblemished and uninterrupted. It will be understood that the invention is not limited to making a container from a single blank but includes containers made up from a plurality of blanks.

What is claimed is:

1. In the method of making from a substantially planar blank of paper, card or board material a container having at least a part thereof of a curved shaped and juxtaposed edges of the blank joined together by a seam of injected molded material and wherein during the making of the container the blank is constrained in a blank cavity with its edges juxtaposed in a mold cavity, said cavities conforming to the final shape of the finished container and being defined between closed core and cavity tools of an injection molding machine, a curved part of one of said tools being on the concave side of the curved part of said blank and a complementarily curved part of the other of said tools being on the convex side of the curved part of said blank, said blank material having inherent resiliency tending to return it to its planar condition when constrained to a curved shape, the improvement comprising providing the surface of the mold tool on the concave side of the curved part of the blank with surface deforming means and providing the other mold tool with a substantially smooth surface, pressing the mold tools against the inner and outer surfaces of the blank until the concave side of the curved part of the blank is deformed by said surface deforming means, and thereafter injecting molten plastic material into said mold cavity to seam the juxtaposed edges of the blank material, the surface deformation of the concave side of the blank material by said surface deforming means being sufficient to reduce the inherent resiliency of the blank tending to return it to its planar condition and thereby reduce the strain on each seam between juxtaposed edges of the blank due to said inherent resiliency of said blank material.

2. The method according to claim 1 wherein the surface deforming means comprises recessess on the core tool into which blank material is caused to penetrate upon pressing the blank material between the tools.

3. The method according to claim 2 in which the recesses comprise longitudinally extending channels in the core tool.

* * * * *